(12) United States Patent
Ebert et al.

(10) Patent No.: US 11,286,994 B2
(45) Date of Patent: Mar. 29, 2022

(54) MULTIPLE-CLUTCH ASSEMBLY, DUAL-CLUTCH TRANSMISSION ASSEMBLY AND MOTOR VEHICLE

(71) Applicant: ZF FRIEDRICHSHAFEN AG, Friedrichshafen (DE)

(72) Inventors: Angelika Ebert, Schonungen (DE); Steffen Matschas, Bad Bocklet (DE); Johannes Friess, Michelau im Steigerwald (DE)

(73) Assignee: ZF Friedrichshafen AG, Friedrichshafen (DE)

(*) Notice: Subject to any disclaimer, the term of this patent is extended or adjusted under 35 U.S.C. 154(b) by 180 days.

(21) Appl. No.: 16/604,281

(22) PCT Filed: Mar. 5, 2018

(86) PCT No.: PCT/EP2018/055250
§ 371 (c)(1),
(2) Date: Oct. 10, 2019

(87) PCT Pub. No.: WO2018/188852
PCT Pub. Date: Oct. 18, 2018

(65) Prior Publication Data
US 2020/0049208 A1 Feb. 13, 2020

(30) Foreign Application Priority Data
Apr. 11, 2017 (DE) .................. 10 2017 206 218.5

(51) Int. Cl.
*F16D 13/68* (2006.01)
*F16H 48/24* (2006.01)
(Continued)

(52) U.S. Cl.
CPC ....... *F16D 13/683* (2013.01); *F16D 25/0638* (2013.01); *F16D 25/10* (2013.01);
(Continued)

(58) Field of Classification Search
CPC ............. F16D 21/06; F16D 2021/0661; F16D 25/068; F16D 25/0638; F16D 25/10;
(Continued)

(56) References Cited

U.S. PATENT DOCUMENTS 7,318,512 B2 * 1/2008 Bauer ............... F16D 25/10
192/48.619
8,511,450 B2 * 8/2013 Gold ............... F16D 25/123
192/48.619

(Continued)

FOREIGN PATENT DOCUMENTS

| DE | 102007022422 | 11/2008 |
|---|---|---|
| DE | 102009059944 | 7/2010 |

(Continued)

OTHER PUBLICATIONS

Office Action for the corresponding German Patent Application No. 10 2017 206 218.5.

*Primary Examiner* — Richard M Lorence
(74) *Attorney, Agent, or Firm* — Cozen O'Connor

(57) ABSTRACT

A clutch arrangement arranged between a drive unit and a transmission, with at least one multi-plate clutch having an outer plate carrier and an actuation element. The actuation element, particularly a piston, has openings for receiving the outer plate carrier.

11 Claims, 2 Drawing Sheets

(51) Int. Cl.
    *F16H 63/08*         (2006.01)
    *F16D 25/10*         (2006.01)
    *F16D 25/0638*     (2006.01)
    *F16H 63/02*         (2006.01)
    *F16D 21/06*         (2006.01)

(52) U.S. Cl.
    CPC ............. *F16H 48/24* (2013.01); *F16H 63/08* (2013.01); *F16D 2021/0661* (2013.01); *F16H 2063/025* (2013.01)

(58) Field of Classification Search
    CPC ......... F16D 13/52; F16D 13/683; B60K 6/38; B60K 6/387; B60K 6/48; F16H 48/24; F16H 63/08; F16H 2063/025
    See application file for complete search history.

(56) References Cited

U.S. PATENT DOCUMENTS

| | | | | |
|---|---|---|---|---|
| 8,757,305 B2 * | 6/2014 | Roske | ...................... | B60K 6/40 180/65.22 |
| 2007/0161450 A1 | 7/2007 | Onishi et al. | | |
| 2011/0259698 A1 * | 10/2011 | Arnold | .................. | B60K 6/405 192/48.1 |
| 2017/0268580 A1 * | 9/2017 | Dole | ....................... | F16D 13/52 |
| 2020/0141453 A1 * | 5/2020 | Ebert | ................... | F16D 13/648 |

FOREIGN PATENT DOCUMENTS

| | | |
|---|---|---|
| DE | 102009038344 | 2/2011 |
| DE | 102012021074 | 4/2014 |
| DE | 102016217210 | 3/2017 |
| WO | WO 2015/165458 | 11/2015 |

\* cited by examiner

MULTIPLE-CLUTCH ASSEMBLY, DUAL-CLUTCH TRANSMISSION ASSEMBLY AND MOTOR VEHICLE

CROSS REFERENCE TO RELATED APPLICATIONS

This is a U.S. national stage of Application No. PCT/EP2018/055250 filed Mar. 5, 2018. Priority is claimed on German Application No. DE 10 2017 206 218.5 filed Apr. 11, 2017 the content of which is incorporated herein by reference.

BACKGROUND OF THE INVENTION

1. Field of the Invention

The invention is directed to a clutch arrangement arranged between a drive unit and a transmission having at least one multi-plate clutch with an outer plate carrier and an actuation element.

2. Description of the Prior Art

In known clutch arrangements, an actuation element is located inside of the housing of the clutch arrangement. Particularly in disconnect clutches, dual clutches, and triple clutches in hybrid powertrains, there is a need for a construction that can be adapted in a more flexible manner for various boundary constraints.

SUMMARY OF THE INVENTION

In view of the foregoing, it is an object of one aspect of the present invention to provide a clutch arrangement in which it is possible to construct the clutch arrangement to be optimized with respect to installation space.

According to one aspect of the invention, the actuation element has openings for receiving an outer plate carrier. When the actuation element is formed without an actuation bearing, it is usually denoted as a piston. When a bearing is located between the pressure space and the element that can actuate the clutch, the designation is inconsistent. This construction and possibly other constructions deviating from a piston are also designated by the expression "actuation element".

Due to the fact that the actuation element has openings, the outer plate carrier can be fitted to the piston during assembly. Further, the outer plate carrier can serve to axially secure the piston as soon as it is attached.

The openings can advantageously be formed as elongate holes. In particular, the longitudinal axis of the elongate holes can extend in axial direction of the clutch arrangement. This orientation allows the outer plate carrier to be fitted and inserted in the simplest possible manner.

The outer plate carrier can advantageously have fingers that engage in the openings. Accordingly, these fingers face radially inward. The outer plate carrier is accordingly pot-shaped in principle, but has a very large opening at the base into which the fingers are directed. This not only facilitates the assembly of the outer plate carrier, but can also economize on a large part of its weight. Further, the overall axial length can also be reduced by economizing on material.

The outer plate carrier can advantageously be arranged on the input side of the multi-plate clutch. In other words, it is the input plate carrier of the clutch.

The clutch arrangement can advantageously have at least two multi-plate clutches, and the radially outer outer plate carrier can be connected to the radially inner outer plate carrier so as to be fixed with respect to rotation relative to it. Accordingly, the radially outer plate carrier, particularly the outer plate carrier having the fingers, can be lengthened radially inward without having to provide material especially for this purpose. In particular, the radially outer plate carrier can be fastened to the radially inner plate carrier. For example, the radially outer plate carrier can be connected by bonding, particularly welded.

The clutch arrangement can preferably have at least three multi-plate clutches, and the multi-plate clutches can comprise an outer plate carrier in each instance, and the outer plate carrier can form the housing of the multi-clutch arrangement. That is, there are no further housing parts of which the housing is comprised other than the outer plate carriers. This configuration can also economize on axial installation space.

One of the multi-plate clutches can advantageously be formed as starting clutch. That is, in particular, the clutch arrangement can have a disconnect clutch, a starting clutch, and a second power shift clutch, and the starting clutch is one of the two power shift clutches of the transmission, e.g., drag starts and pulse starts for the start-stop function can be implemented with the disconnect clutch.

At least one multi-plate clutch, particularly all multi-plate clutches, can preferably be formed as wet clutches.

The clutch arrangement can advantageously be a triple clutch arrangement. It can have the clutches in the manner described above.

One aspect of the invention is additionally directed to a hybrid dual clutch transmission arrangement with a clutch arrangement. The hybrid dual clutch transmission arrangement is characterized in that the clutch arrangement is configured in the manner described above.

The hybrid dual clutch transmission arrangement preferably has, as second drive unit, an electric motor arranged axially parallel to the transmission input shafts.

The dual clutch transmission arrangement can advantageously configured in countershaft-type construction.

One aspect of the invention is additionally directed to a motor vehicle having a clutch arrangement and/or a dual clutch transmission arrangement. The motor vehicle is characterized in that the clutch arrangement and/or the dual clutch transmission arrangement is configured in the manner described above.

BRIEF DESCRIPTION OF THE DRAWINGS

Further advantages, features and details are apparent from the following description of embodiment examples and figures. The drawings show.

DETAILED DESCRIPTION OF THE PRESENTLY PREFERRED EMBODIMENTS

Figure 1:
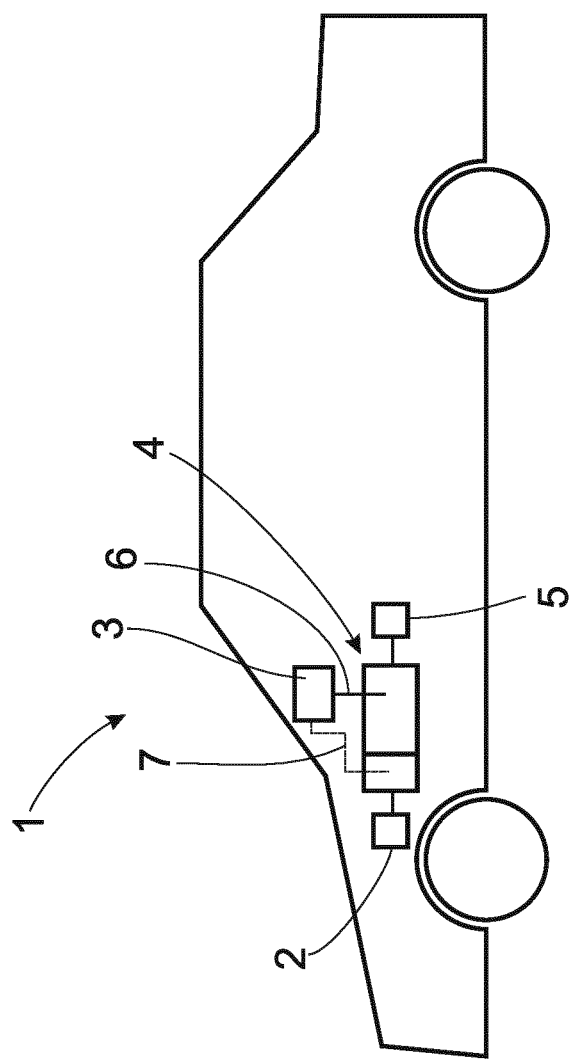
FIG. 1 is a motor vehicle.

FIG. 1 shows a motor vehicle 1 with a first drive unit 2, a second drive unit 3, a dual clutch transmission arrangement 4, and a differential 5. The first drive unit preferably comprises an internal combustion engine. The second drive unit 3, which is switched off particularly in the form of an electric motor, can act on the drivetrain either as indicated by line 6 or by dashed line 7. Cooperation with one or both transmission input shafts is designated as P2 arrangement and a cooperation with the transmission itself is designated as P3 arrangement. In addition, a P1 arrangement and a P4 arrangement are also known. These represent the basic variants of a parallel arrangement of first drive unit 2 and second drive unit 3. A clutch arrangement for a P2 arrangement is described in the following.

Figure 2:
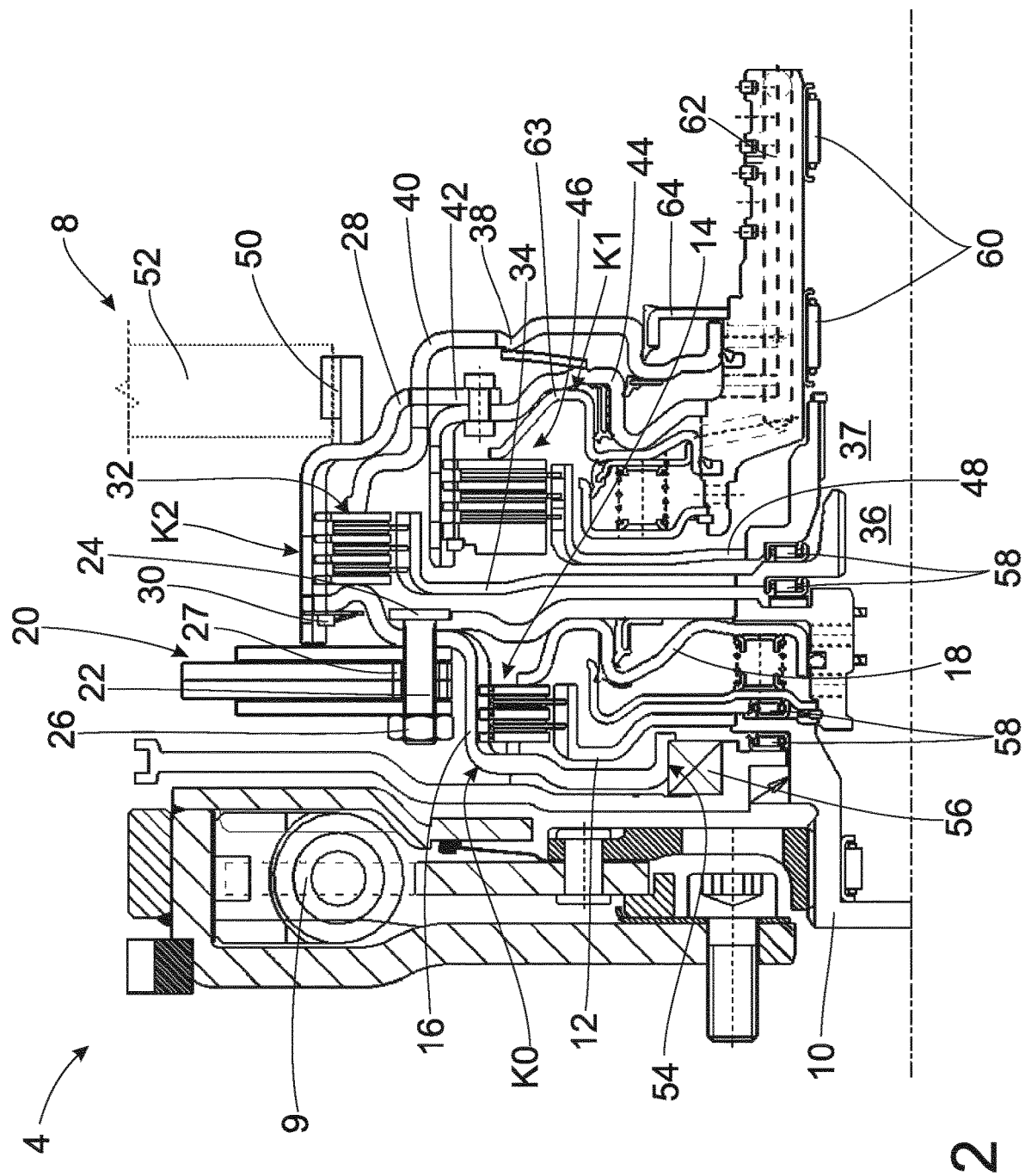
FIG. 2 is a clutch arrangement.

FIG. 2 shows a clutch arrangement 8 as part of the dual clutch transmission arrangement 4. The dual clutch transmission arrangement 4 is hybridized so that torque can reach the transmission via two paths. The first path leads from the first drive unit 2 via a torsional damper 9 for damping torsional vibrations, in particular a dual mass flywheel 9, and a hub 10 to the disconnect clutch K0. The input plate carrier of the disconnect clutch K0, namely, the inner plate carrier 12, is connected to hub 10 so as to be fixed with respect to rotation relative to it. The torque can be transmitted to the outer plate carrier 16 via lamination stack 14. A piston 18 is provided for actuating the disconnect clutch K0.

A speed-adaptive mass damper 20 is fastened on the output side of disconnect clutch K0, namely, to the output plate carrier, in this case, outer plate carrier 16. The speed-adaptive mass damper 20 is detachably connected to outer plate carrier 16. For example, mass damper 20 can be screwed to outer plate carrier 16 by a screw 22. In so doing, the screw head 24 is arranged inside of the clutch arrangement 8, while the nut 26 is arranged on the outside. A sleeve 27 is located between mass damper 20 and screw 26. The path plates of the mass damper 20 are spaced apart axially by this sleeve 27 when the screw assembly is closed.

Outer plate carrier 28 is connected to outer plate carrier 16 so as to be fixed with respect to rotation relative to it. For example, outer plate carrier 16 and outer plate carrier 28 can be connected by positive engagement. A snap ring 30 can be used to axially secure outer plate carrier 16 relative to outer plate carrier 18. Outer plate carrier 28 is the input plate carrier of clutch K2, which is formed as multi-plate clutch and constitutes one of the two power shift clutches of the dual clutch transmission arrangement 4. If disconnect clutch K0 is closed, the torque is transmitted via outer plate carrier 16, outer plate carrier 28, and lamination stack 32 of clutch K2 to the inner plate carrier 34 and, from the latter, to the radially inner transmission input shaft 36.

In order to connect outer plate carriers 16 and 28, mass damper 20 can be disassembled from outer plate carrier 16 to expose the interface.

Clutch K2 has piston 38 for actuation. Piston 38 has a plurality of openings 40 in the form of elongate holes that are distributed in circumferential direction and in which the outer plate carrier 28 can engage. More accurately, a plurality of fingers 42 of outer plate carrier 28 engage in the openings 40 of piston 38. Piston 38 accordingly remains axially displaceable relative to outer plate carrier 28.

Clutch K1, which is formed as a starting clutch, is located radially inside of clutch K2. Outer plate carrier 28 is connected to outer plate carrier 44 of clutch K1 so as to be fixed with respect to rotation relative to it. In particular, outer plate carriers 28 and 44 may be welded. Accordingly, the torque that is transmitted from the first drive unit 2 can also reach clutch K1. Outer plate carrier 44 is accordingly the input plate carrier of clutch K1. Torque can arrive at the radially outer transmission input shaft 37 via the lamination stack 46.

Openings 40 for receiving the fingers 42 are preferably arranged at the radially outer edge, also known as pot wall, of piston 38. Piston 38 has a pot shape. Fingers 42 of outer plate carrier 28 can be inserted at the outer edge of the base, for which reason the openings 40 are preferably located at the latter.

A sprocket wheel 50 can be fastened to the outer plate carrier 28. Sprocket wheel 50 can be welded to outer plate carrier 28, for example. This outer plate carrier 28 engages with a chain 52 that connects the electric motor 3 and clutch arrangement 8. Electric motor 3 acts on the input side of the two clutches K1 and K2, since output plate carrier 28 is the input plate carrier of clutch K2 on the one hand and is connected to outer plate carrier 44 of clutch K1 so as to be fixed with respect to rotation relative to it on the other hand. Outer plate carrier 44 of clutch K1 is also the input plate carrier. Accordingly, FIG. 2 shows a P2 arrangement with respect to the coupling of the electric motor 3.

As a result of the construction and connection of outer plate carriers 16, 28, and 44, the latter form the housing of clutch arrangement 8. Clutch arrangement 8 is a multi-clutch arrangement and, in particular, a triple clutch arrangement. Apart from outer plate carriers 16, 28, and 44, there are no further housing parts. This results in a construction which is optimized with respect to installation space.

Since mass damper 20 is detachably connected to outer plate carrier 16, the outer plate carriers 16 and 28 can be connected before mass damper 20 is connected to clutch arrangement 8.

The described construction with the outer plate carriers as housing also enables a simplified bearing support of clutch arrangement 8. In particular, clutch arrangement 8 can have only one radial bearing location 54 on the engine side. Bearing 56 can be formed as a radial ball bearing. This can preferably be a thrust and journal bearing. However, it is the sole bearing with a radial bearing function on the engine side.

Further, clutch arrangement 8 has two thrust bearings 58 on the engine side and transmission side, respectively. Thrust bearings 58 serve for axial bearing support of inner plate carriers 12, 34, and 48. Accordingly, they are arranged at the bases of inner plate carriers 12, 34, and 48. On the transmission side, clutch arrangement 8 has two needle bearings 60 for radial bearing support, these two needle bearings 60 supporting hub 62. Hub 62 is formed as an oil feed hub. It accordingly comprises oil channels and seals. Hub 62 is connected to outer plate carrier 44 so as to be fixed with respect to rotation relative to it. However, the torque flow is not carried out as in known dual clutch arrangements via the hub to the outer plate carrier. On the contrary, the torque comes from the outer plate carrier, more accurately from outer plate carrier 28, via outer plate carrier 44 to hub 62.

Piston 63 of clutch K1 is likewise supported on hub 62. The seal carrier 64 for sealing the pressure space of clutch K2 is also arranged at hub 62.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A clutch arrangement configured to be arranged between a drive unit and a transmission, comprising:
   an actuation element; and
   at least three multi-plate clutches, wherein each of the at least three multi-plate clutches comprise a respective outer plate carrier, and the respective outer plate carriers form a housing of the clutch arrangement,
   wherein the actuation element defines openings for receiving radially inwardly extending fingers arranged on a radially innermost portion of a radially outermost one of the outer plate carriers of the multi-plate clutches, and wherein the radially outermost outer plate carrier is rotationally fixed to a radially inner outer plate carrier by the fingers.

2. The clutch arrangement according to claim 1, wherein the openings are formed as elongate holes.

3. The clutch arrangement according to claim 1, wherein the outer plate carrier is arranged on an input side of the at least one multi-plate clutch.

4. The clutch arrangement according to one of claim 1, wherein the radially outermost plate carrier is welded to the radially inner outer plate carrier.

5. The clutch arrangement according to claim 1, wherein one of the multi-plate clutches is a starter clutch.

6. The clutch arrangement according to claim 1, wherein one of the multi-plate clutches is a disconnect clutch.

7. The clutch arrangement according to claim 1, wherein the clutch arrangement is a triple clutch arrangement.

8. The clutch arrangement according to claim 1, wherein the actuation element is a piston.

9. A hybrid dual clutch transmission arrangement, comprising:
   a clutch arrangement configured to be arranged between a drive unit and a transmission, and comprising:
   an actuation element; and
   at least three multi-plate clutches, wherein each of the at least three multi-plate clutches comprise a respective outer plate carrier, and the respective outer plate carriers form a housing of the clutch arrangement,
   wherein the actuation element defines openings for receiving radially inwardly extending fingers arranged on a radially innermost portion of a radially outermost one of the outer plate carriers of the multi-plate clutches, and wherein the radially outermost outer plate carrier is rotationally fixed to a radially inner outer plate carrier by the fingers.

10. A motor vehicle comprising:
    a drive unit;
    a transmission; and
    at least one of a clutch arrangement configured to be arranged between the drive unit and the transmission and a dual clutch transmission arrangement configured to be arranged between the drive unit and the transmission, each comprising:
    an actuation element; and
    at least three multi-plate clutches, wherein the at least three multi-plate clutches comprise a respective outer plate carrier, and the respective outer plate carriers form a housing of the clutch arrangement,
    wherein the actuation element defines openings for receiving radially inwardly extending fingers arranged on a radially innermost portion of a radially outermost one of the outer plate carriers of the multi-plate clutches, and wherein the radially outermost outer plate carrier is rotationally fixed to a radially inner outer plate carrier by the fingers.

11. The clutch arrangement according to claim 1, wherein there are no further housing parts of which the housing is comprised other than the outer plate carriers.

* * * * *